United States Patent

Yokota

[11] Patent Number: 6,058,320
[45] Date of Patent: May 2, 2000

[54] METHOD AND DEVICE FOR CONTROLLING THE POWER SOURCE OF A PORTABLE RADIO TRANSCEIVER

[75] Inventor: Hidetsugu Yokota, Saitama, Japan

[73] Assignee: NEC Corporation, Tokyo, Japan

[21] Appl. No.: 08/985,874

[22] Filed: Dec. 5, 1997

[30]   Foreign Application Priority Data

Dec. 12, 1996   [JP]   Japan ................................ 8-331713

[51] Int. Cl.[7] .............................. H04B 1/38; H04M 1/00; H04M 11/00
[52] U.S. Cl. ......................... 455/574; 455/572; 455/404
[58] Field of Search ................................... 455/574, 565, 455/72, 127, 38.3, 404, 572

[56]   References Cited

U.S. PATENT DOCUMENTS

| | | | |
|---|---|---|---|
| 4,509,201 | 4/1985 | Sekigawa et al. | 340/636 |
| 5,095,308 | 3/1992 | Hewitt | 340/825.44 |
| 5,155,428 | 10/1992 | Kang | 320/136 |
| 5,278,995 | 1/1994 | Hwang | 455/127 |
| 5,438,612 | 8/1995 | Norimatsu | 455/565 |
| 5,633,862 | 5/1997 | Suzuki et al. | 455/72 |
| 5,640,441 | 6/1997 | Serrano et al. | 379/34 |
| 5,907,795 | 5/1999 | Hwang | 455/38.3 |

FOREIGN PATENT DOCUMENTS

| | | | |
|---|---|---|---|
| 2175861 | 12/1996 | Canada | H04B 1/40 |
| 61-170232 | 7/1986 | Japan . | |
| 61-170233 | 7/1986 | Japan . | |
| 62-154118 | 7/1987 | Japan . | |
| 63-11028 | 1/1988 | Japan . | |
| 4-142125 | 5/1992 | Japan . | |
| 6-6282 | 1/1994 | Japan . | |
| 7-131402 | 5/1995 | Japan . | |
| 7-326998 | 12/1995 | Japan . | |
| 2 302 770 | 1/1997 | United Kingdom . | |

*Primary Examiner*—Dwayne D. Bost
*Assistant Examiner*—Ray Persino
*Attorney, Agent, or Firm*—Young & Thompson

[57]   ABSTRACT

A portable radio telephone or transceiver in which power source control is effected to prevent cases in which the telephone cannot be used due to lack of battery charge, and is made up of: a voltage detector 1 that detects the voltage of a battery 2 and outputs battery voltage information 11; memory 5 that stores voltage 51, which is a voltage at which the remaining charge of a battery is nearly exhausted, and voltage 521 higher than voltage 51, to enable the battery to operate the radio transceiver for at least one calling operation; key input detector 4 that detects the key input and outputs key input information 41; processor 3 which compares voltage 52 with battery voltage information 11 and outputs switch control signal 31 which operates to disconnect the battery from the main circuit when voltage information 11 is less than voltage 52; and switch 8 that disconnects the battery from main circuit 7 in accordance with switch control signal 31.

14 Claims, 2 Drawing Sheets

METHOD AND DEVICE FOR CONTROLLING THE POWER SOURCE OF A PORTABLE RADIO TRANSCEIVER

BACKGROUND OF THE INVENTION

1. Field of the Invention

The present invention relates to a power source control system and power source control method for a portable radio transceiver, and particularly to a power source control system and power source control method for controlling battery voltage in a portable radio transceiver.

2. Description of the Related Art

Power source control systems of the prior art include examples that control battery voltage. One example of such a power source control system is described in Japanese Patent Application Laid-open No. 154118/87. This power source control system includes a back-up device wherein, when the power supply to a device is cut off, a back-up supply current is controlled in accordance with the remaining charge of a secondary battery.

This type of power source control system can extend the life of the battery by detecting the remaining charge of the battery from the discharge rate of the battery, finding the amount of current that can be obtained, and altering the permissible current of the electrical devices connected to the battery.

The power source control system of a portable radio transceiver, moreover, can predict whether the remaining battery charge will last the duration of a particular day in cases in which calls are made on the portable radio transceiver with great frequency based on the amount of call time and the remaining battery charge indicated on the portable radio transceiver, and as a result, allows the user to know when to carry a reserve battery.

There remains the problem, however, that in cases when a user is not making calls on the transceiver with great frequency and therefore does not carry a reserve battery, the user may easily leave the portable radio transceiver in a call waiting state for an extended period of time, only to find that when the user wants to make a call, the battery charge is exhausted and calling is impossible.

SUMMARY OF THE INVENTION

The object of the present invention is to provide a power source control system and power source control method for a portable radio transceiver that allows use of the transceiver even in the absence of an exchange battery or battery charger by cutting off the power source of the portable radio transceiver when a charge is remaining in a battery, and then reconnecting the power source.

The power source control system for a portable radio transceiver according to the present invention effects control such that, when the portable radio transceiver is left unattended in a call waiting state, the battery of the portable radio transceiver is cut off when a particular fixed amount of battery charge is left.

In more concrete terms, the present invention is provided with: a switching means for supplying voltage of the battery to a main circuit; a key input detection means that detects the presence or absence of key input from keys for operating the portable radio transceiver; a storage means that stores in advance first voltage information, which is the voltage when the remaining charge of the battery is nearly exhausted, and second voltage information, which is a voltage higher than the voltage of the first voltage information; and processing means that compares either the first voltage information or the second voltage information with the battery voltage in accordance with key input information of the key input detection means, and decides whether to connect or disconnect the switching means. By means of this construction, the power source of a portable radio transceiver is cut off so as to leave a fixed remaining battery charge sufficient to allow a call, thereby allowing power to be reconnected and calling accomplished even when power has been cut off when the portable radio transceiver has been left in a call waiting state.

The power source control system for a portable radio transceiver according to the present invention compares the battery voltage and the first voltage information and supplies battery voltage of the battery to the main circuit when the battery voltage is greater than the first voltage information, but does not supply battery voltage of the battery to the main circuit when it compares the battery voltage with the first voltage information and finds that the battery voltage is lower than the first voltage information or when the battery voltage is equal to the first voltage information.

The power source control method for a portable radio transceiver according to the present invention cuts off the power source of the portable radio transceiver, and thereby leaves a fixed remaining battery charge sufficient for making a call. As a result, the power source may be reconnected and a call made even when the power source has been cut off when the portable radio transceiver is left in a call waiting state. The power source can thus be connected and the portable radio transceiver used even in the absence of a replacement battery or a battery charger by cutting off the power source of a portable radio transceiver when the remaining charge of the battery is at a fixed amount. The above and other objects, features, and advantages of the present invention will become apparent from the following description with references to the accompanying drawings which illustrate an example of the present invention.

DETAILED DESCRIPTION OF THE INVENTION

Details of the power source control system and power source control method for a portable radio transceiver according to the present invention will next be presented with reference to the accompanying figures.

Figure 1:
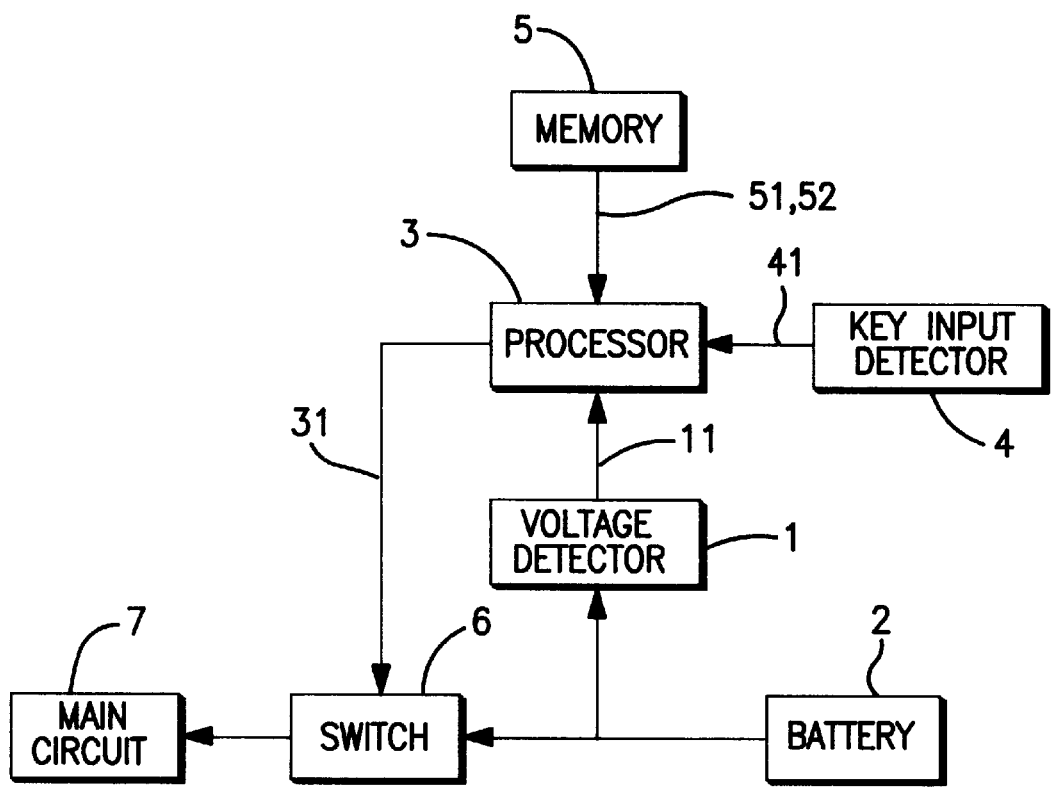
FIG. 1 is a block diagram showing the power source control system of an embodiment of the portable radio transceiver according to the present invention.

Referring to FIG. 1, this embodiment comprises: a voltage detector 1 that detects the voltage of battery 2 and outputs battery voltage information 11; memory 5 that stores first voltage information 51, which is a voltage at which the remaining battery charge is nearly exhausted, and second voltage information 52, which is defined arbitrarily by a user, having a voltage higher than first voltage information 51, and being able to at least operate the radio transceiver; key input detector 4 that detects the presence of key input and outputs key input information 41; processor 3 that reads voltage information 51 or voltage information 52 from memory 5 based on key input information 41 and outputs switch control signal 31 based on the results of comparison with battery voltage information 11; and switch 6 that connects or cuts off battery voltage supply to main circuit 7 in accordance with switch control signal 31.

In FIG. 1, voltage detector 1 detects the voltage of battery 2 and sends battery voltage information 11 to processor 3. This processor 3 reads either voltage information 51 or voltage information 52 from memory 5 based on key input information 41. Here, processor 3 reads voltage information 51, which is information on the voltage at which the remaining battery charge is nearly exhausted. When key input information 41 has key input, switch 6 is connected for as long as the battery voltage is greater than the voltage information 51. The battery voltage is disconnected when battery voltage information is higher than voltage information 51, during periods when there is no key input information in order to conserve the remaining battery charge.

Voltage information 52 can be any value within a particular fixed range according to values stored in memory 5 beforehand by the user. Processor 3 compares battery voltage information 11 with either voltage information 51 or voltage information 52 and outputs switch control signal 31 to switch 6. Here, switch 6 is caused to connect and supply battery voltage to main circuit 7 if battery voltage information 11 is higher than the voltage information being compared, but if battery voltage information 11 is equal or lower than the voltage information being compared, switch 6 is caused to cut off and not supply battery voltage to main circuit 7.

When the power source of a portable radio transceiver is turned on, the input of the power source key is detected by the key input detector 4, whereby processor 3 reads voltage information 51 from memory 5. Supply of voltage to main circuit 7 can thus be resumed even in a case in which supply of voltage to main circuit 7 has been interrupted because battery voltage information 11 has become lower than voltage information 52.

Figure 2:
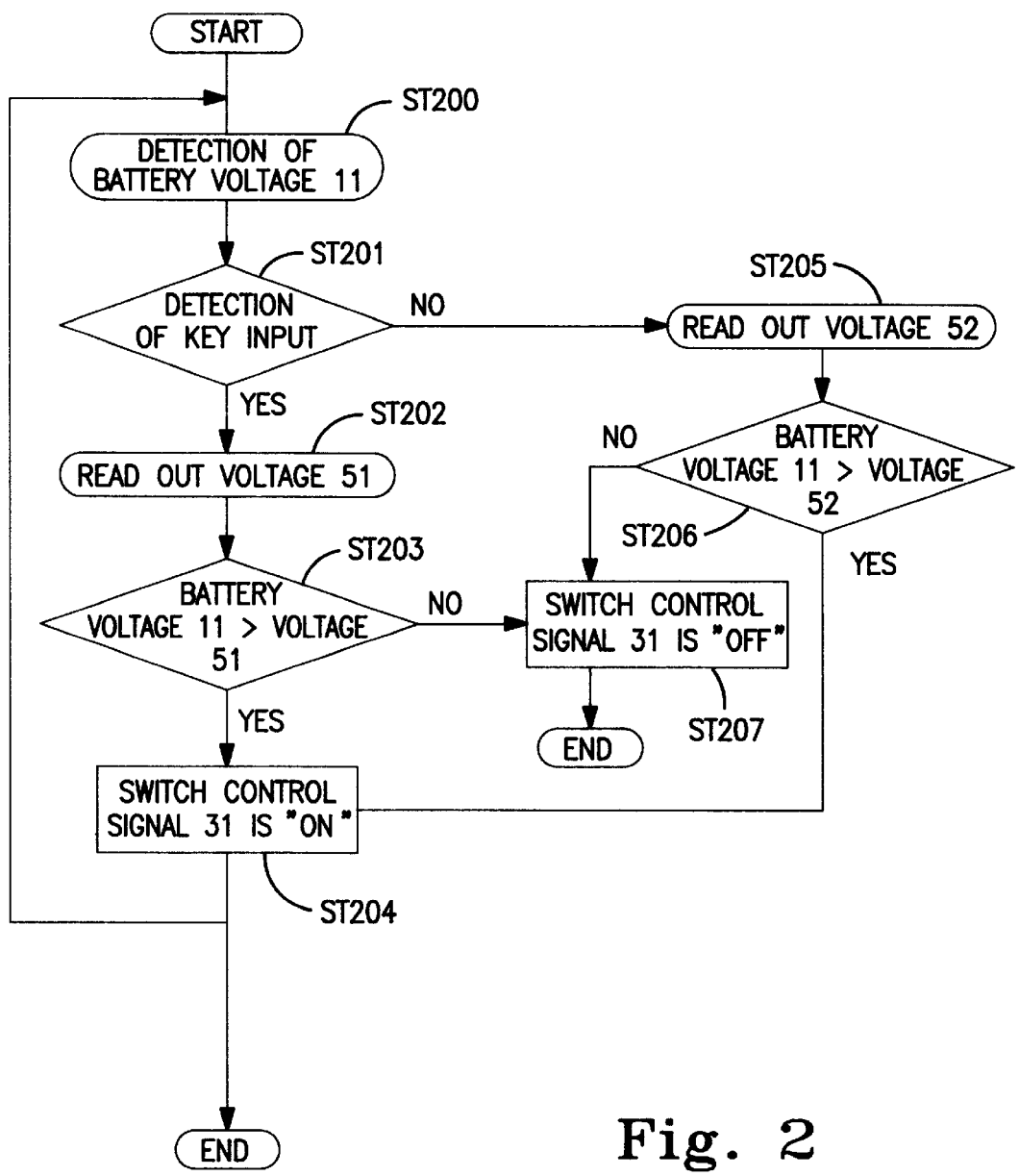
FIG. 2 is a flow chart of the processor of an embodiment of the portable radio transceiver according to the present invention.

Details regarding the operation of the embodiment of this invention will next be presented with reference to FIG. 2. Reference is also made to FIG. 1 in the explanation of this flow.

Voltage detector 1 detects the voltage of battery 2 and sends battery voltage information 11 to processor 3 (ST200). Key input detector 4 next detects whether there is key input from the user (ST201) and if there is key input, sends key input information 41 to processor 3. Here, key input detector 4 determines that key input is present and outputs key input information 41 within a fixed time interval from the occurence of the key input. Alternatively, processor 3 determines the key input state, and carries out processing within a fixed time interval from the occurence of the key input.

Processor 3 reads either voltage information 51 or voltage information 52 from memory 5 based on key input information 41. Here, if key input information 41 is outputted, processor 3 reads voltage information 51, which is information of the voltage at which the remaining battery charge is nearly exhausted (ST202), and if there is no key input information 41, reads voltage information 52, which is a voltage higher than that of voltage information 51 (ST205).

By storing to memory 5 beforehand, the user can set voltage information 52 to any value within a fixed range to enable operation of the radio transceiver. Processor 3 compares battery voltage information 11 with voltage information 51 or voltage information 52 (ST203), and if battery voltage information 11 is higher (when ST203 is "Yes"), inputs switch control signal 31 to switch 6 (ST204). Here, switch 6 is made conductive such that battery voltage is supplied to main circuit 7, and when battery voltage information 11 is equal or lower (ST203 is "No"), switch 6 is cut off such that battery voltage is not supplied to main circuit 7 (ST207).

When the power source of the portable radio transceiver is turned on, the input of power source key is detected at key input detector 4, and processor 3 reads voltage information 51 from memory 5. As a result, when battery voltage information 11 becomes lower than voltage information 52, the supply of voltage to main circuit 7 can be resumed as long as the battery voltage 11 is greater than battery voltage information 51, even when in a state in which supply of voltage to main circuit 7 has been cut off due to the comparison with battery voltage information.

In addition, processor 3 reads voltage information 52 in ST205, and carries out a comparison in ST206 similar to that of ST203. If battery voltage information 11 is higher (when ST206 is "Yes"), the process advances to ST204, whereby switch 6 is made conductive and battery voltage is supplied to main circuit 7, and if battery voltage information 11 is equal or lower (when ST206 is "No"), switch 6 is cut off and battery voltage is not supplied to main circuit 7.

As described above, in this embodiment the battery voltage is compared with the first voltage information, and when the battery voltage is a value higher than the first voltage information, the battery voltage of the battery is supplied to the main circuit. Alternatively, battery voltage is compared with the first voltage information, and when the battery voltage is a value lower than the first voltage information, or when the battery voltage is equal to the first voltage information, the battery voltage of the battery is not supplied to the main circuit.

In this embodiment, the power source of a portable radio transceiver is cut off, leaving a particular fixed remaining battery charge sufficient for making a call. As a result, the remaining charge of the power source can be connected to allow a call to be completed even in a case in which the power source has been cut when the portable radio transceiver has been left in a call waiting state. Thus, by cutting off the power source of the portable radio transceiver while a fixed amount of residual charge of the battery is left, the remaining power can be connected and a call made even in the absence of a replacement battery or a charger.

The above-described power source control system of a portable radio transceiver and power source control method of a portable radio transceiver according to the present invention cuts off the power source of the portable radio transceiver while a particular fixed remaining battery charge is left in cases in which the portable radio transceiver is left in a call waiting condition without key input, thereby circumventing the problem that no battery charge is left when a call is to be made. The invention therefore provides convenience and ease of use for the user. While a preferred embodiment of the present invention has been described using specific terms, such description is for illustrative purposes only, and it is to be understood that changes and variations may be made without departing from the spirit or scope of the following claims.

What is claimed is:

1. A power source control system of a portable radio transceiver comprising:

a power source circuit including a battery;

a main circuit operated by said battery;

a detection circuit that detects the voltage of said battery;

a switching means for selectively connecting and disconnecting the voltage of said battery to said main circuit;

a key input detection means for detecting a key input for operating said portable radio transceiver and for outputting the key input information;

a storage means for advance storing of a predetermined first voltage information representing a first voltage at which a remaining charge of said battery is nearly exhausted and below which the portable radio transceiver will not reliably operate, and a second voltage information representing a second voltage selectively predetermined by a user and being higher than said first voltage and sufficient to maintain operation of the portable radio transceiver for at least one calling operation;

a processing means for comparing said battery voltage with said first voltage and said second voltage selectively while the portable radio transceiver is in a call-waiting state in accordance with key input information of said key input detection means, and deciding whether to cause said switching means to connect or disconnect said battery from said main circuit.

2. A power source control system for a portable radio transceiver according to claim 1 wherein said processing means includes:

a means for comparing the battery voltage with said second voltage when key input information is not being output, and causing said switching means to disconnect said battery from said main circuit when the battery voltage is less than said second voltage; and a means for comparing the battery voltage with said first voltage when key input information is being output, and causing said connect switching means to connect said battery to said main circuit only when the battery voltage is greater than said first voltage.

3. A power source control system of a portable radio transceiver according to claim 2, wherein when the key input detection means detects key input information, said processing means determines that key input is performed and carries out a processing of a call operation during a predetermined time interval following the detection of the key input.

4. A power source control system of a portable radio transceiver according to claim 1 wherein said key input detection means outputs the key input information during a predetermined time interval following the detection of a key input.

5. A power source control system of a portable radio transceiver according to claim 1, wherein when said key input detection means detects key input information, said processing means determines that key input is performed and carries out a processing of a call operation during a predetermined time interval following the detection of the key input.

6. A power source control method of a portable radio transceiver having a power source circuit including a battery, a main circuit operated by the battery, and a detection circuit that detects the voltage of the battery, comprising the steps of:

storing a first voltage information which is the voltage at which the remaining charge of the battery is nearly exhausted, and a second voltage information which is a voltage defined arbitrarily by a user to be higher than the first voltage information, and at which the battery is able to maintain normal operation of the radio transceiver for at least one calling operation;

placing the portable radio transceiver in a call-waiting state;

detecting a key input and outputting the key input information when the key input is detected;

measuring the voltage of the battery, comparing the battery voltage with the first voltage information and the second voltage information selectively in accordance with key input information, and deciding whether to connect the battery to the main circuit.

7. A power source control method of a portable radio transceiver according to claim 6, wherein the step of comparing the battery voltage with the first and second voltage information comprises the steps of:

disconnecting the battery voltage from the main circuit when the battery voltage is less than the second voltage information during periods when the key input information is not being output; and connecting the battery voltage to the main circuit only when the battery voltage is greater than the first voltage information during periods when the key input information is being output.

8. A power source control method of a portable radio transceiver according to claim 7 further including the steps of:

keeping the key input information being output for a predetermined duration following the detection of key input;

judging whether to connect the battery to the main circuit during the predetermined duration following the detection of the key input.

9. A power source control method of a portable radio transceiver according to claim 6 further including the steps of:

keeping the key input information being output for a predetermined duration following the detection of key input;

judging whether to connect the battery to the main circuit during the predetermined duration following the detection of the key input.

10. A power source control system of a portable radio telephone comprising:

a memory unit adapted to store a predetermined first voltage value corresponding to a voltage below which the remaining charge of the portable radio telephone battery is nearly exhausted and below which a main circuit of the portable radio telephone will not reliably operate, and a predetermined second voltage value corresponding to a user-defined voltage higher than said predetermined first voltage value and being sufficient to maintain a desired battery reserve.

11. The power source control system of claim 10, further comprising:

a processing means operatively connected to said memory unit for i) receiving key input information from a key input detector, ii) determining whether the portable radio telephone is in a call-waiting state, iii) selectively comparing said predetermined first voltage value and said predetermined second voltage value with the voltage of said battery in accordance with the key input information and the operating state of the portable radio telephone, and iv) deciding whether to allow connection of said battery to said main circuit.

12. The power source control system of claim 11, further comprising:

a switch controlled by said processing means and connecting said battery to said main circuit.

13. The power source control system of claim 12, wherein said processing means selectively operates in at least one of a first mode and a second mode, said first mode being selected when the portable radio telephone is in a call-waiting state wherein upon key input information being detected said processing means causes said switch to connect said battery to said main circuit if said battery voltage is greater than said first voltage value, and to disconnect said battery from said main circuit if said battery voltage is less than said first voltage value, and said second mode being selected when the portable radio telephone is in a call-waiting state wherein key input information is not detected, and wherein said processing means causes said switch to connect said battery to said main circuit if said battery voltage is greater than said second voltage value, and to disconnect said battery from said main circuit if said battery voltage is less than said second voltage value.

14. The power source control system of claim 10, wherein said desired battery reserve is user-selected to allow completion of at least one calling operation when the portable radio telephone is left in a call-waiting state.

* * * * *